United States Patent
Angeline

(10) Patent No.: US 7,890,574 B2
(45) Date of Patent: Feb. 15, 2011

(54) INTERNET OPERATING SYSTEM THROUGH EMBEDDABLE APPLET-STYLE APPLICATION

(76) Inventor: Brent J. Angeline, RR#1, Box 1884, Friendsville, PA (US) 18818

( * ) Notice: Subject to any disclaimer, the term of this patent is extended or adjusted under 35 U.S.C. 154(b) by 608 days.

(21) Appl. No.: 11/431,679

(22) Filed: May 10, 2006

(65) Prior Publication Data

US 2006/0259592 A1    Nov. 16, 2006

Related U.S. Application Data

(60) Provisional application No. 60/679,224, filed on May 10, 2005.

(51) Int. Cl.
*G06F 15/16* (2006.01)
(52) U.S. Cl. ..................................... 709/203
(58) Field of Classification Search ............... 709/204, 709/220–228, 201, 209; 370/270, 465, 477, 370/351–358; 310/26–28; 705/4
See application file for complete search history.

(56) References Cited

U.S. PATENT DOCUMENTS

| | | | |
|---|---|---|---|
| 6,199,099 B1 * | 3/2001 | Gershman et al. ........... 709/203 |
| 6,643,683 B1 * | 11/2003 | Drumm et al. .............. 709/203 |
| 2002/0059402 A1 * | 5/2002 | Belanger .................... 709/220 |
| 2003/0018644 A1 * | 1/2003 | Bala et al. .................... 707/100 |
| 2004/0019508 A1 * | 1/2004 | Yaruss et al. ................. 705/4 |

OTHER PUBLICATIONS

Harry Newton, "Newton's Telecom Dictionary", Mar. 2004, CMP Books, 20th edition (Frontpage, p. 5, 483 and 762).*
Nortel Networks, "Multimedia PC Client User Guide" Dec. 2003.*

* cited by examiner

*Primary Examiner* — Joseph Avellino
*Assistant Examiner* — Mark O Afolabi
(74) *Attorney, Agent, or Firm* — Mark Levy; Hinman, Howard & Kattell, LLP; David L. Banner

(57) ABSTRACT

An Internet-based operating system providing data and application software stored on a server that may be selectively downloaded to a client device upon request, allowing server-based applications to be accessed and executed on the client device. The end user, operating a client device may access a wide variety of application software with no need to purchase, install, and maintain the software on his machine. Using an easy-to-use GUI, a user selects an application, opens existing or creates new files. The application executable code is identified by a link embedded in a stream of markup language, typically XML. The operating system allows complex applications to be executed on thin clients having limited memory/storage capacity.

15 Claims, 7 Drawing Sheets

INTERNET OPERATING SYSTEM THROUGH EMBEDDABLE APPLET-STYLE APPLICATION

RELATED APPLICATIONS

This application claims priority in accordance with 35 U.S.C. §119(e) to U.S. Provisional Application Ser. No. 60/679,224, filed May 10, 2005.

FIELD OF THE INVENTION

The present invention pertains to operating systems and graphical user interfaces and, more particularly, to a web-based operating system including a secure web-based multi-tasking graphical user interface allowing dynamic and selective user access to a customized repository of application programs, documents, and media.

BACKGROUND OF THE INVENTION

As computers have become ubiquitous, people have increasingly begun to rely upon them as foundational tools, and as devices for communications, amusement, and entertainment devices. Indeed, computers perform many other functions and fill numerous other roles. The explosion of computer use is primarily due to the steep decrease in cost over the past several years. Miniaturization has also allowed computer processing power to be packaged in smaller and smaller spaces, thereby allowing users to become mobile. Users, therefore, demand that sophisticated applications be made available on smaller and smaller devices.

For example, a personal data assistant (PDA) is now available with a scaled-down operating system and is capable of executing application software heretofore only available on a traditional desktop computer. Even cellular telephones now boast data processing capability unimagined only a few year ago.

Historically, most computing was performed on central, mainframe computers having "dumb" (i.e., peripheral terminals having little if any resident computing capability) terminals attached thereto. The application software ran (i.e., was executed) on the mainframe and users interacted with that software from the attached terminals. The terminals were typically text based and communication between the terminals and the mainframe was generally by way of a serial communications protocol such as the well-known RS-232 protocol over dedicated cables. Communications speeds were limited, but that was not a significant hindrance, as textual communication typically requires only a limited communications bandwidth.

As computer applications software grew in sophistication and as graphical user interfaces (GUIs) became more prominent, the required communications bandwidth increased significantly. Fortunately, the cost of computer hardware had decreased to the point where it became possible to execute sophisticated software applications in situ on individual computers. Communications could, when necessary, be provided to transmit data to and receive data from a mainframe.

At the beginning of the $21^{st}$ century, the vast majority of application software being executed was on stand-alone computing devices with linkage being provided to remote servers, typically via the Internet or other such networks.

However, the collision of smaller (e.g., hand-held), computing devices and the increasing hardware requirements demanded by ever more sophisticated application programs has again suggested a return to the concept of central execution of the application software with remotely deployed devices interconnected to a "mainframe". Nowhere is this problem better illustrated than in current cellular telephone handsets. Current generation handsets have a graphical user interface implemented using a high resolution LCD or similar display. However, the demand for lightweight phones limits both the processing and storage capability available in the handset. Consequently, while current generation hardware devices may have sufficient processing power, they still are incapable of providing enough bulk storage to store modern application software. Consequently, it is highly desirable to store application software on a remote server and allow a local computing device (e.g., cellular handset or PDA functioning as a smart terminal) access thereto.

SUMMARY OF THE INVENTION

The system and method of the present invention provides an Internet-based operating system whereby application software stored on a server may be selectively downloaded to a user of a client device upon request therefrom. This allows server-based applications to be accessed and then executed on a client device located remotely therefrom. Because secure communication may readily be established between the server and the client device, many traditional problems of remote data access are overcome.

As used herein, application software includes applications from the categories of office/productivity software (e.g., word processors, spreadsheets, etc.), database, communication, multimedia; imaging, and games. Application software is typically written in Java that provides an inherently virus-proof programming language. The end user, operating a client device located remote to the server, may thereby access and execute a wide variety of application software with no need to purchase, install, and maintain the software on his or her machine. Using an easy-to-use interface (i.e., a GUI), a user may readily select an appropriate application, open existing or create new files (e.g., documents, folders, etc.). The interface allows for multitasking several applications. The application software (i.e., the executable code) is embedded within a page defined by a stream of a markup language, typically XML or a derivative or equivalent thereof. The executable code is generally referred to by a link such as a tag embedded in the XML stream. The system of the-invention allows complex applications to be executed on a small (e.g., "thin") client device having limited memory/storage capacity. The server provides storage, as well as security control for a user's files.

The Interos operating system of the invention maintains user preferences thereby allowing a customized GUI to be made available on the client device.

At least three previously known techniques and technologies are utilized in a novel manner to implement what is effectively an Internet-based operating system. One embodiment of the novel operating system is the acronym Interos derived from Internet and operating system.

It is, therefore, an object of the invention to provide an Internet-based operating system for storing software application programs on a server remote from a local, client computing device.

It is a further object of the invention to provide a system and method for allowing storage of application software remotely from a local computing device wherein communications between the remote server and the local computing device are by means of a network, for example, the Internet.

It is another object of the invention to provide an Internet-based operating system having a user-customizable graphical user interface (GUI).

It is a further object of the invention to provide an Internet-based operating system having an easy-to-use, simplified GUI using color buttons to provided user interaction therewith.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

Figure 1:
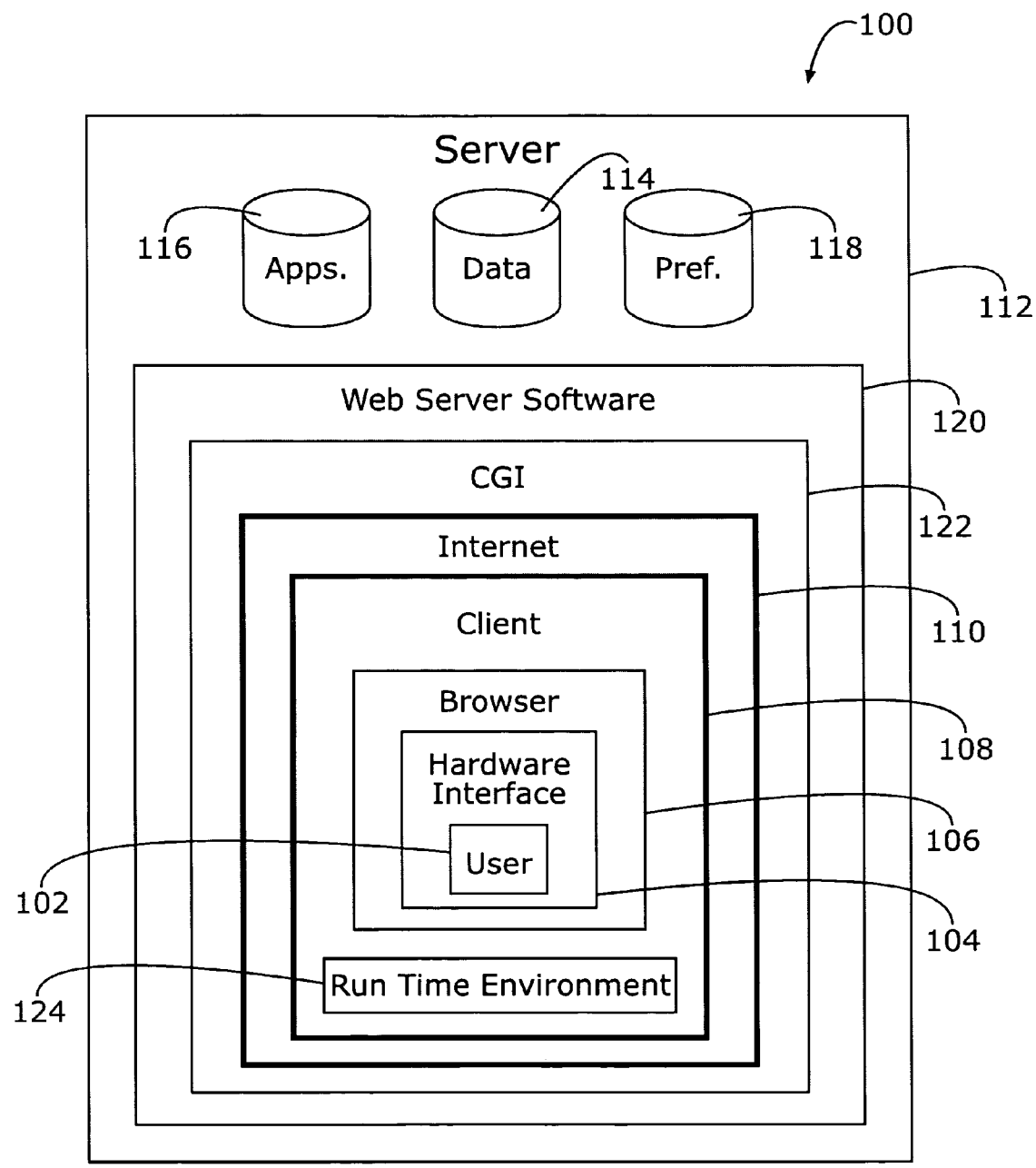
FIG. 1 is a schematic, structural representation of the Internet-based operating system of the invention.

The present invention provides a virtual, Internet-based operating system including a secure graphical user interface (GUI) that allows a user menu-like selective access to a wide range of diverse application programs and other resources on a server.

The operating system is the most important program that runs on most computers. Each general-purpose computer must utilize an operating system to run other programs. Operating systems perform basic tasks such as recognizing input from a peripheral device (i.e., a keyboard, pointing device, or other input device), writing information to a display screen, keeping track of files and directories on a storage device, and controlling peripheral devices such as disk drives and printers.

In large computer systems, the operating system has even greater responsibilities and powers. It is like a traffic cop, ensuring that different programs and users running concurrently do not interfere with each other. The operating system is also largely responsible for security, ensuring that unauthorized users do not access the system.

Operating systems provide a software platform on top of which other programs, called application programs, can run. However, each application program must be written to run on top of a particular operating system. The choice of operating system, therefore, determines to a great extent the applications that may be run. For PCs, historically the most popular operating systems are DOS, OS/2, and Windows, but others are available, such as Linux.

A computer user normally interacts with the operating system through a set of commands. For example, the DOS operating system contains commands such as COPY and RENAME for copying files and changing the names of files, respectively. The commands are accepted and executed by a part of the operating system called the command processor or command line interpreter. Graphical user interfaces allow a user to enter commands by pointing and clicking at objects that appear on the screen with a computer mouse or other such device, or by using a touch pad.

All traditional operating systems run on a specific local computing device. As devices have shrunk, the traditional operating systems have also shrunk to operate in the limited resources of, for example, a PDA or cellular handset. In traditional computing, each application program resides on a local storage device associated with the computing device and is executed upon command by a user, typically using a GUI and a pointing device.

As is discussed hereinabove, this traditional computing environment suffers from many problems. These problems are readily overcome using the system and method of the present invention.

It is assumed for purposes of disclosure that the local computing device (i.e., the client) has a graphical display, a GUI input, a web browser (e.g., Microsoft Internet Explorer® or the like), and network connection capability. Also, for purposes of disclosure, it is assumed that the-network connection comprises the Internet. The terms Internet and World Wide Web (www or web) are also used interchangeably herein.

It is well known to present mixed text and graphical information to the display screen. In its most fundamental implementation, this is done using a series of Extensible Markup Language (XML) commands. The web browser parses the XML command stream and the content defined by the XML command stream is subsequently displayed on the display screen of the computing device. While complex graphical displays may readily be generated using XML, it is a one-way, descriptive language. That is, there is no facility for dynamically altering the content displayed to the user once the XML command stream has been sent from the server. While XML defines a specific set of markup commands, the term XML is used generically herein to refer to any similar markup language (e.g., HTML, XHTML, etc.).

To overcome the limitations of static XML presentations, a programming technique know as common gateway interface (CGI) was developed. CGI is a specification for transferring information between a World Wide Web server and a CGI program (i.e., any program designed to accept and return data that conforms to the CGI specification). The CGI program may be written in any programming language, including, for example, C, Perl™, Java™, Visual Basic™, ASP™, PHP, etc. A CGI program provides a way for web servers to interact dynamically with users. For example, HTML pages that contain forms may use a CGI program to process the form's data once it's submitted. It should be noted that the CGI program executes at the server, not at the client (i.e., CGI is a server side application).

One problem with CGI is that each time a CGI script is executed, a new process is started. For busy web sites, this can slow down the server noticeably. This problem may be overcome by utilizing FastCGI extensions to CGI or other known techniques.

CGI may be thought of as a dynamic interface language. While useful, for example, in interfacing a user to a back office database or in formatting server output to the user, there is no facility within CGI to dynamically select and securely download executable code of a software application for execution on a client as is provided by the system and method of the present invention.

Because CGI techniques provide such limited features, other alternatives for dynamic, interactive generation of web pages must be found. Currently, most such solutions rely on Java or JavaScript. Java is an object-oriented programming language that is platform independent (i.e., the same Java program typically runs on all hardware platforms without modification). Originally developed by Sun Microsystems, Java is widely used on the web for both client and server processing. Java was designed to run embedded, making it ideal for applications designed for PDAs, cellular telephones, etc.

Java programs can be called from web pages or run standalone. When launched from a web page, the program is called a Java "applet." When a non web-based Java program is run on a user's machine, it is a Java "application."

Java applets are of particular relevance to the present invention. These programs are downloaded from the server and run from the browser, with a Java virtual machine (JVM) interpreting the instructions (i.e., executing the program). The Java virtual machine may be implemented as a browser plug-in or in any other manner. It will further be recognized that languages other than Java (e.g., Flash) may also be used. In which case, a run time environment (RTE) matching the language of the code to be executed must be provided. As used herein, the terms "virtual machine" and "run time environment" are used interchangeably. The source code of a Java program (e.g. applet) is compiled into an intermediate language called "bytecode". In order to run the bytecode, it must be either precompiled into machine code or, as is the case with browser-executed applets, interpreted by the JVM just before it is needed. Java was originally developed in 1991 as a language for embedded applications such as those used in set-top boxes and other consumer-oriented devices. While Java applications and applets have been mildly successful at the client side, Java on the server has become very popular.

Java is a full-blown programming language, whereas JavaScript is a scripting language that is much more limited in scope. JavaScript source code is not compiled into bytecode; rather it is embedded within an HTML page and is primarily used to manipulate elements on the page itself. For example, JavaScript is widely used to provide drop-down menus and other interactive events on the page. Javascript is widely supported in web browsers and other browser-type applications. It may be used to add interactive functions to HTML pages, which are otherwise static, since HTML is a display language, not a programming language. JavaScript is considered easier to use than Java, but is not as powerful and deals mainly with the elements on the web page. On the client device, JavaScript is maintained as source code embedded into an HTML page.

JavaScript does not have the programming overhead of Java, but can be used in conjunction with it. For example, a JavaScript script may be used to display a data entry form and validate the input, while a Java applet, Java servlet or CGI more thoroughly processes the information. JavaScript is also used to tie Java applets together. However, even the implementation of Java and/or Javascript with CGI and other languages or techniques still fails to provide an environment or a technological infrastructure capable of allowing the level of functionality in executing web-based applications in a secure, integrated environment provided by the instant invention.

To further enhance the interactivity and/or dynamic nature of web pages, a technique called Asynchronous JavaScript And XML, better known by its acronym, AJAX, evolved. AJAX is a web development technique useful for creating interactive web applications. The intent is to make web pages feel more responsive to a user by exchanging small amounts of data with the server behind the scenes. By exchanging only portions of the web page, an entire web page does not need to be reloaded each time the user makes a change. This increases the web page's interactivity, speed, and usability.

The AJAX technique uses a combination of XHTML (or HTML), and cascading style sheets (CSS) for marking up and styling information.

The document object model (DOM) is accessed with a client-side scripting language like JavaScript or JScript, to dynamically display and interact with the information presented.

The XMLHttpRequest object is used to exchange data asynchronously with the web server. In some AJAX frameworks and in certain situations, an IFrame object is used instead of the XMLHttpRequest object to exchange data with the web server.

XML is commonly used as the format for transferring data to and from the server, although any format will work, including preformatted HTML, plain text, and other formats known to those of skill in the art. AJAX is not a technology in itself, but a term that refers to the use of a group of technologies together.

AJAX applications are mainly executed on the client machine, by manipulating the current page within their browser using document object model methods. AJAX can be used for a multitude of tasks such as updating or deleting records; expanding web forms; returning simple search queries; or editing category trees; all without the requirement to fetch a full page of HTML each time a change is made. Generally only small requests are required to be sent to the server, and relatively short responses are sent back. This permits the development of more interactive applications featuring more responsive user interfaces due to the use of DHTML techniques.

Although AJAX greatly enhances a developer's ability to present dynamic web pages to a user, the AJAX technique still fails to enable, alone or in cooperation with other known technologies and techniques, the server-based storage and client side execution of user-selected and user-controlled applications.

In a hardware analogy, before the widespread use of microprocessors, PALs, PROMS, etc., hardware devices were hard-wired and could perform only the function(s) for which they were designed. Upgrading or expanding the circuit required physical rewiring, component replacement, etc. The introduction of programmable devices, however, meant that the function(s) of a hardware device implemented therewith could be changed by reprogramming, for example, by reburning a PROM, etc. The dynamic, interactive system of the present invention provides to the flexibility of server-side stored, client-side application execution strategies what the microprocessor brought to hardware design. In other words, the system of the present invention allows reprogrammable web-based software. For the first time, a virtual operating system existing at the server is available to service the needs of a user at a client device running a web browser across a network, for example, the Internet.

An exemplary embodiment of the inventive system is provided by Internet Operating System (Interos) described herein, and available to users at interos.com. While the Interos embodiment is chosen for purposes of disclosure, it will be recognized that myriad alternate embodiments of the inventive concept are possible. Consequently, the invention is not considered limited to the Interos embodiment chosen for purposes of disclosure. Rather, the invention covers any and all other implementations of the inventive concepts.

Referring first to FIG. 1, there is shown a schematic conceptual diagram of the Interos system, generally at reference number 100. A user 102 interacts with a browser 106 through a hardware interface 104. Browser 106 is executed on a client hardware device 108 connected to the Internet 110. While the Internet is used for purposes of disclosure, it will be recognized that Interos may function effectively in any network environment. Consequently, the invention is not limited to the Internet but is seen to include any and all network topologies or methods.

A server 112 hosts at least user data 114, application software 116 and user demographic, security, or preference information 118. Server 112 has a web server layer 120 and a CGI layer 122, which, in turn, is interfaced to the Internet 110. As may readily be seen in FIG. 1, Interos provides a closed, self-contained environment that fosters security and allows developing robust systems for reliable operation.

Client device 108 may be selected from among a wide range of computing and communications devices know to those of skill in the art. Client device 108 may be a personal computer (PC), a Macintosh computer (Mac), a server, a workstation, a laptop or notebook computer, a computing device supporting Linux or UNIX, a personal data device (PDA), a mobile (e.g., cellular) telephone, other wireless device, an Internet appliance, and the like. Any platform (e.g., client device 108) may be used, even a device having tiny embedded Linux as long as the qualifications discussed hereinbelow are met.

Client device 108 must be able to support a browser 106 and have a user interface (e.g., a hardware interface 104). Typically, client device 108 has a display screen, not shown, and a data input means, not shown. However, it will be recognized by those of skill in the art that hardware interface 104 may consist of many other visual, auditory, or tactile devices capable of receiving data from and providing data to a user 102. All user interaction with application software 116 and with user data 114 or with user preference or security information 118 is via hardware interface 104 and browser 106.

Browser 106 is typically a web browser. The Interos system is designed from the ground-up to optimally maintain and protect a user's data. Consequently, it is designed to work optimally with Mozilla™ Gecko™-based browsers. Such browsers include Firefox™, Mozilla™, Netscape™, and the like. These and other Gecko-based browsers are well known to those of skill in the art and are not further described herein. These Gecko-based browsers have recently grown in popularity because of the security features provided thereby. The system of the invention also operates satisfactorily using the Microsoft Internet Explorer™ family of browsers, also believed to be well known to those of skill in the art. It is further possible that other browsers currently exist or may be developed in the future that will operate satisfactorily with the Interos system. Consequently, the invention is not limited to the browser or browsers chosen for purposes of disclosure. Rather, the invention includes any and all suitable browsers.

It is necessary for a suitable run time environment 124 to be available within client 108, either as a part of browser 106 (e.g., a plug-in, etc.) or elsewhere present within client device 108. Assuming that application programs 116 are written in Java, run time environment 124 is a Java virtual machine. It will be recognized that other programming languages (e.g., Flash, etc.) may be used to write application software 116. Run time environment 124, of course, then must support execution code written in that language. When Java is the language of choice, it is further assumed that Java source code is compiled and that the executable application software code 116 is Java bytecode as is well know to those of skill in the programming arts.

It is assumed that client device 108 includes network connectivity allowing connection to server 112. The inventive system may be used across any network using any suitable interface mechanism and/or communications technology. Such interface mechanisms and communications technologies may include, for example, telecommunications in any suitable form (e.g., voice, modem, and the like), wireless communications media, wireless communications networks, cellular communications networks, G3 communications networks, Public Switched Telephone Network (PSTNs), Packet Data Networks (PDNs), the Internet, intranets, a combination thereof, and the like. More specifically, the communications technology may include, for example, radio frequency (RF) communication, infrared (IR) communication, HTTP (hyper text transmission protocol), TCP/IP (transmission control protocol/Internet protocol), LAN, WAN, WIFI, PPP (Point-to-Point), SSL (Secure Socket Layer), TLS (transport layer security), IrDa, USB, Firewire™, Bluetooth™ protocol, GSM (global system for mobile communication), GPRS (general packet radio™ system), UMTS (universal mobile telephone system), and the like. Consequently, the invention is not limited to the Internet 110 chosen for purposes of disclosure. Rather, the invention includes any of the aforementioned network topologies, systems, or methods as well as any other suitable network systems known, or yet to be invented or designed.

In addition, the client devices 108 used with the invention may access the network (e.g., Internet 110) on which the invention is being used through any suitable transmission media, including, for example, coaxial cables, twisted pair, copper wire, fiber optics, and the like. Transmission media also can take the form of acoustic, optical, electromagnetic waves, and the like, such as those generated during radio frequency (RF) communications, infrared (IR) data communications, and the like.

Servers 112 are known to those of skill in the art and with the exception of several details discussed hereinbelow are not further described herein. Server 112 includes a web server layer also know to those of skill in the art. One web server layer found suitable for the application is Apache Web Server from Apache Software Foundation, Forrest Hills, Md., USA. It will be recognized that other similar products may be substituted therefor.

Server 112 is equipped with suitable software to implement a common gateway interface (CGI) 122. Implementations of CGI 122 are also well known and are not, therefore, discussed in detail herein. FastCGI, an extension to CGI from Open Market that improves performance by maintaining persistent connections, has been found preferable for implementing Interos 100.

The heart of the Interos system 100 is the ability to store application software as executable code on a server and to efficiently and securely selectively download such executable code from a server 112 to a client device 108 via a network connection, for example, the Internet 110.

The Interos system of the present invention has been designed from the ground up as an all-encompassing web-based service that provides for all computing needs, as well as for media content storage and/or distribution. The design objectives include a high quality of service, excellent system stability, security, speed, ease of use, and resistance to viruses, spy ware, and other dangerous, and/or annoying problems prevalent in the current computing environment. Interos has a logical organizational hierarchy so that it is easy to understand, and its color-coding makes it easy enough for a young child to use. Interos provides simple and fast file sharing, but content can be managed for commercial media and software distribution. Interos supports advertising in versions designed for free or low-cost access by users.

A stable base of free software from which a user can readily find and select an application is provided. The software base may be readily added to as an "open" policy is maintained. Software need only be written in a language (e.g., Java) that is executable by an existing run time environment via a browser on a client machine. The Interos system simplifies access to software application—select it and use it. This design approach eliminates needs for downloading and installing software packages. Version upgrades are made to the software in the Interos central repository so users always have access to the latest version of the applications.

Figure 2:
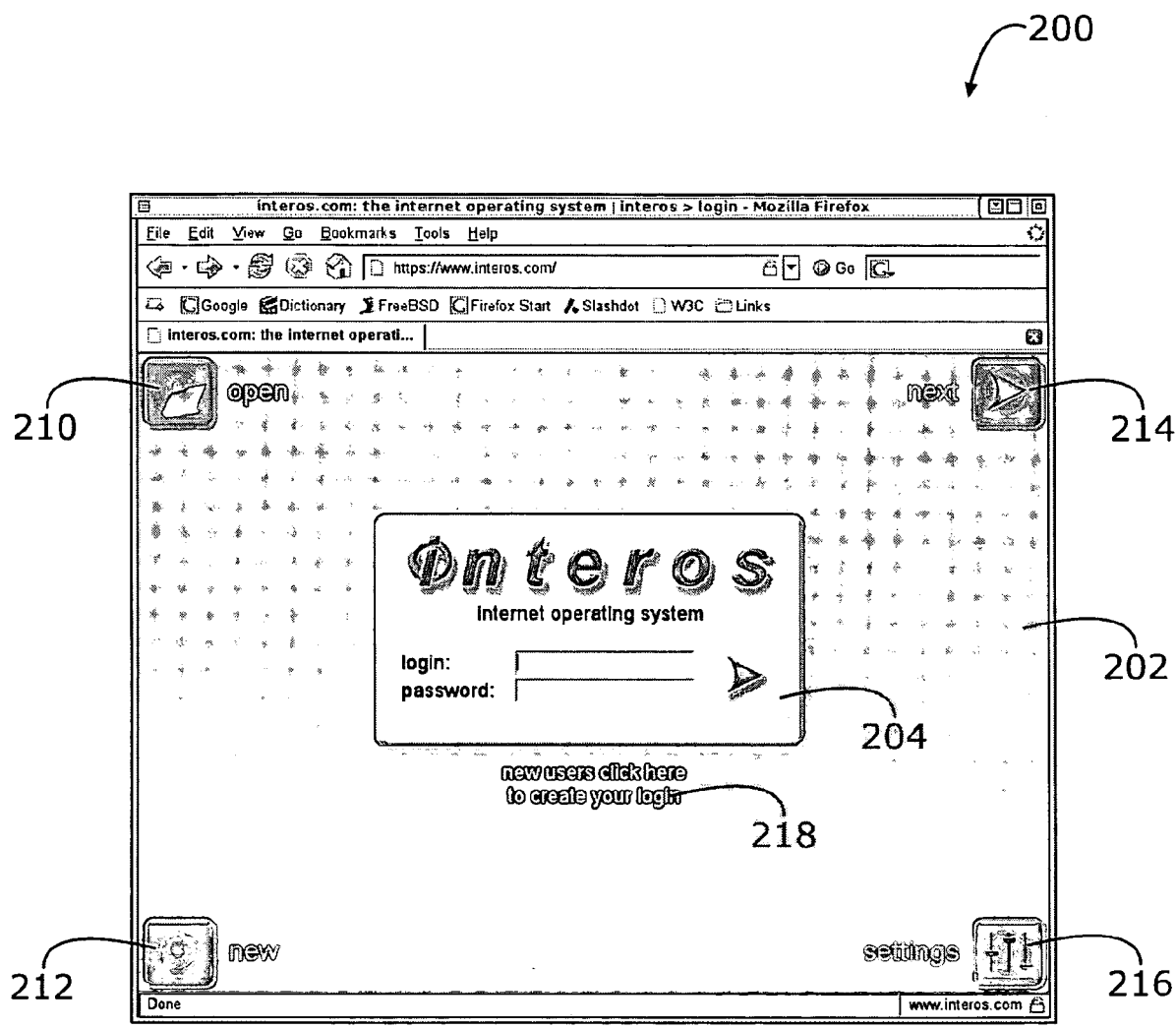
FIG. 2 is a screen shot of a log-in screen of the Interos embodiment of the invention.

Much of the ease of use of Interos is the result of the unique Interos GUI. Referring now to FIG. 2, there is shown a screen shot of a log-in screen 200 initially presented to a user of the Interos system of the invention. A Mozilla Firefox browser has been chosen for the exemplary embodiment. It will be recognized, as discussed hereinabove, that other suitable browsers may be used to interact with the Interos system of the invention. The browser screen region or workspace-202 is substantially rectangular as is typically displayed on a computer monitor, not shown. It will be recognized that log-in 200, provided by the Interos GUI will be properly displayed on any particular client machine 108 (FIG. 1).

Centered in workspace 202 appear a log-in region 204 with lines 206, 208 where a known or registered user enters a log-in name and password, respectively. Below box 204 appears a region 218 where a new (i.e., unknown or non-registered) potential user may "click" to be directed to a registration page, not shown. As used herein, the term click refers to any action by a user to communicate via the GUI, generally performed by a pointing device,-not shown, or by a touch-sensitive screen as provided, for example, on a typical PDA, not shown.

Four action "buttons" 210, 212, 214, and 216, are disposed in the four corners of workspace 202. As used herein, the term button is used to refer to any region or feature that a user may click to initiate an action or select an option. The four buttons 212, 210, 214, and 216 are "New", "Open", "Next", and "Settings", respectively. The actions performed by each of buttons 210, 212, 214, and 216 are described in detail hereinbelow. Buttons 210, 212, 214, and 216 optionally may be color coded to indicate an inherent, natural sequence of operations. For example, new button 212 may be green, open button 210 may be yellow, etc.

It should also be noted that the Interos system may use mnemonically significant, color-coded icons to implement a GUI that is intuitive and easy to use. The GUI of screen 200 is typically standard and controlled by the Interos system. As is discussed hereinbelow, user preferences stored by the Interos server determine the appearance of subsequent screens in the Interos system.

Figure 3:
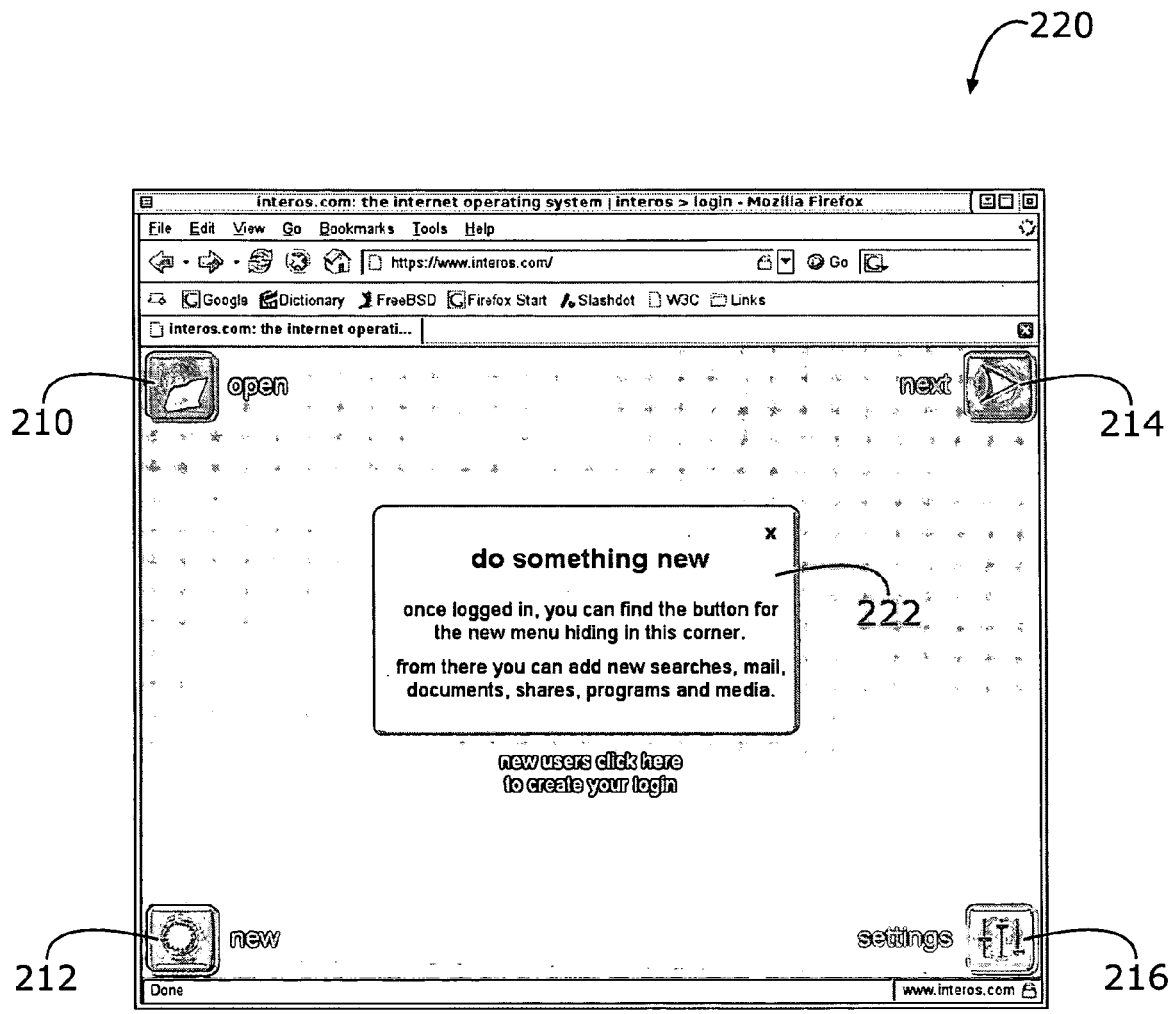
FIG. 3 is a screen shot of a typical mouse over help screen of the Interos embodiment of the invention.

Referring now to FIG. 3, there is shown a screen shot 220 with an Interos-generated explanation of the "New" button 212. Interos implements a mouse over help system wherein when a pointing device positions a cursor proximate one of the buttons, for example, buttons 210, 212, 214, and 216. The information shown in area 222 is obtained when the pointing device, not shown, is positioned proximate button 212. This Interos feature makes obtaining context-sensitive help easy.

Figure 4:
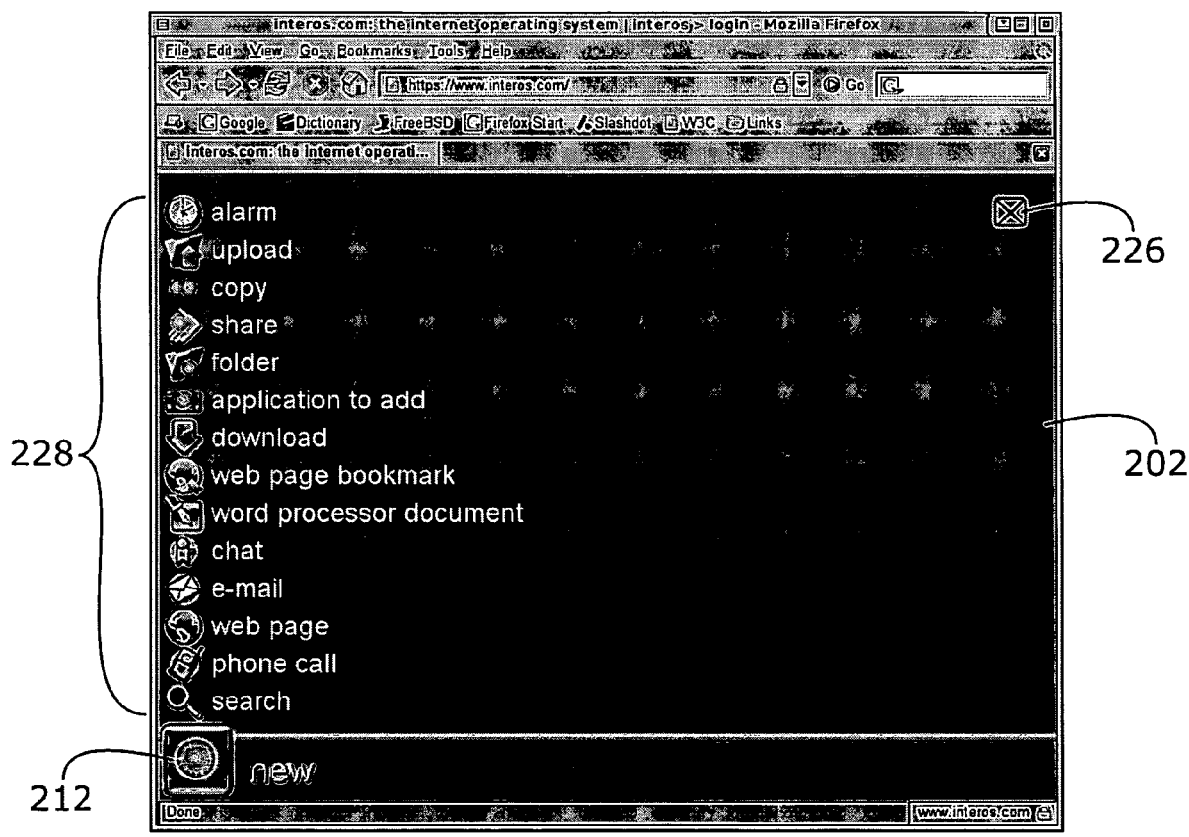
FIG. 4 is a screen shot of a new menu of the Interos embodiment of the invention.

Referring still to FIG. 3 and now also to FIG. 4, pressing new button 212 causes new menu 228 to be displayed. Selecting any item from new menu 228 allows the user to perform a new web search, create a new bookmark, send a new e-mail, create a new document, establish a new share; get new media; and select new applications and games to run. Of course sub-menus may be used to select among multiple options within any category in new menu 228. It will also be recognized that menu entries may be added to or existing entries deleted from new menu 228 as is required for a particular embodiment of the inventive system. The menu may be closed by clicking "X" 226 in the upper-right corner of workspace 202.

Figure 5:
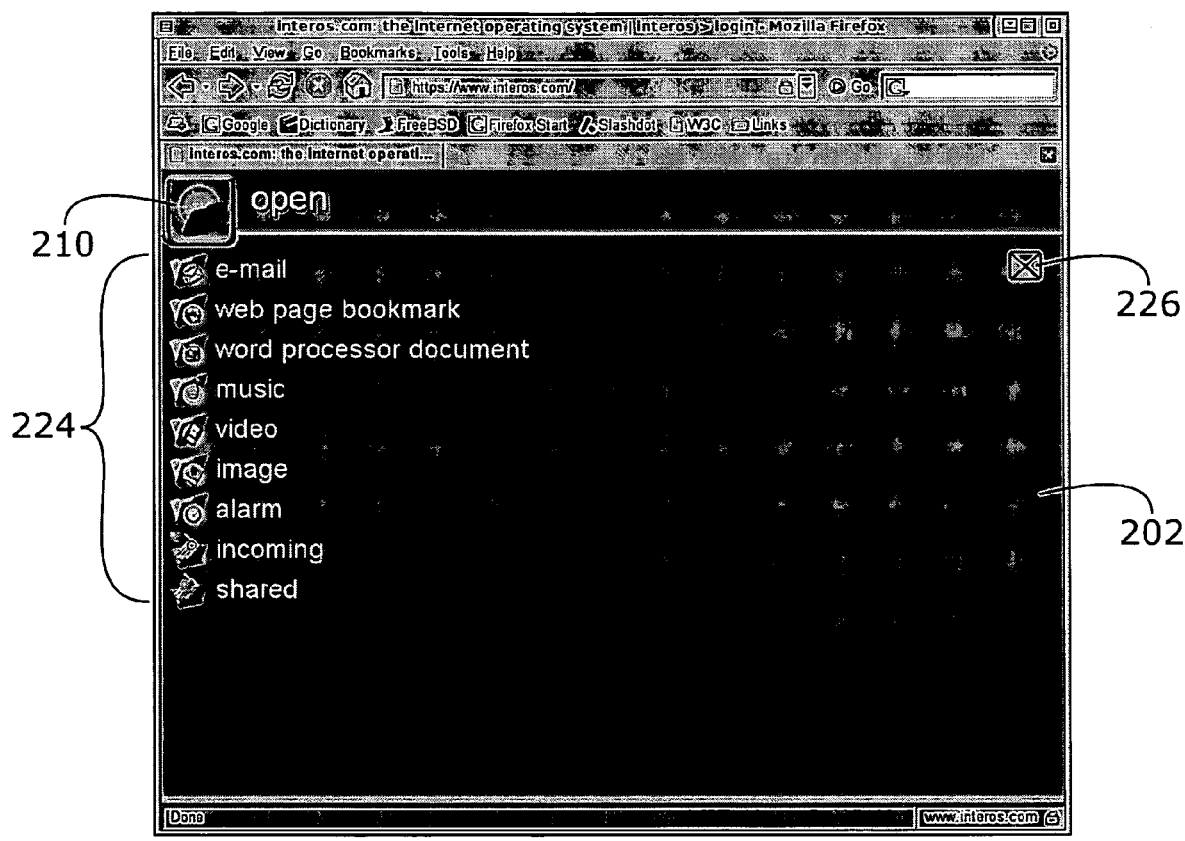
FIG. 5 is a screen shot of an open menu of the Interos embodiment of the invention.

Referring still to FIG. 3 and now also to FIG. 5, clicking open button 210 causes an open menu 224 to be displayed. In the Interos system chosen for purposes of disclosure, nine menu choices are presented: e-mail, web page bookmark, word processing document, music, video, image, alarm, incoming, and shared. Of course it will be recognized that many other possibilities could be added or substituted to meet a particular operating circumstance or environment. Clicking any choice within open menu 224 selects something previously saved to be opened. The menu 224 may also be exited by clicking "X" 226 in the upper right-hand corner of workspace 202. Selection of any item from open menu 224 causes data, typically stored on server 112 (FIG. 1) to be made available along with the appropriate program 116 (FIG. 1), both of which are downloaded to the user for use thereby. Typically, one or more sub-menus, not shown, are utilized to select from among the potentially many data items within a particular category of saved items displayed in menu 224. Drilling down to a particular data item using sub-menus or the like is considered well know and not further discussed herein.

Figure 6:
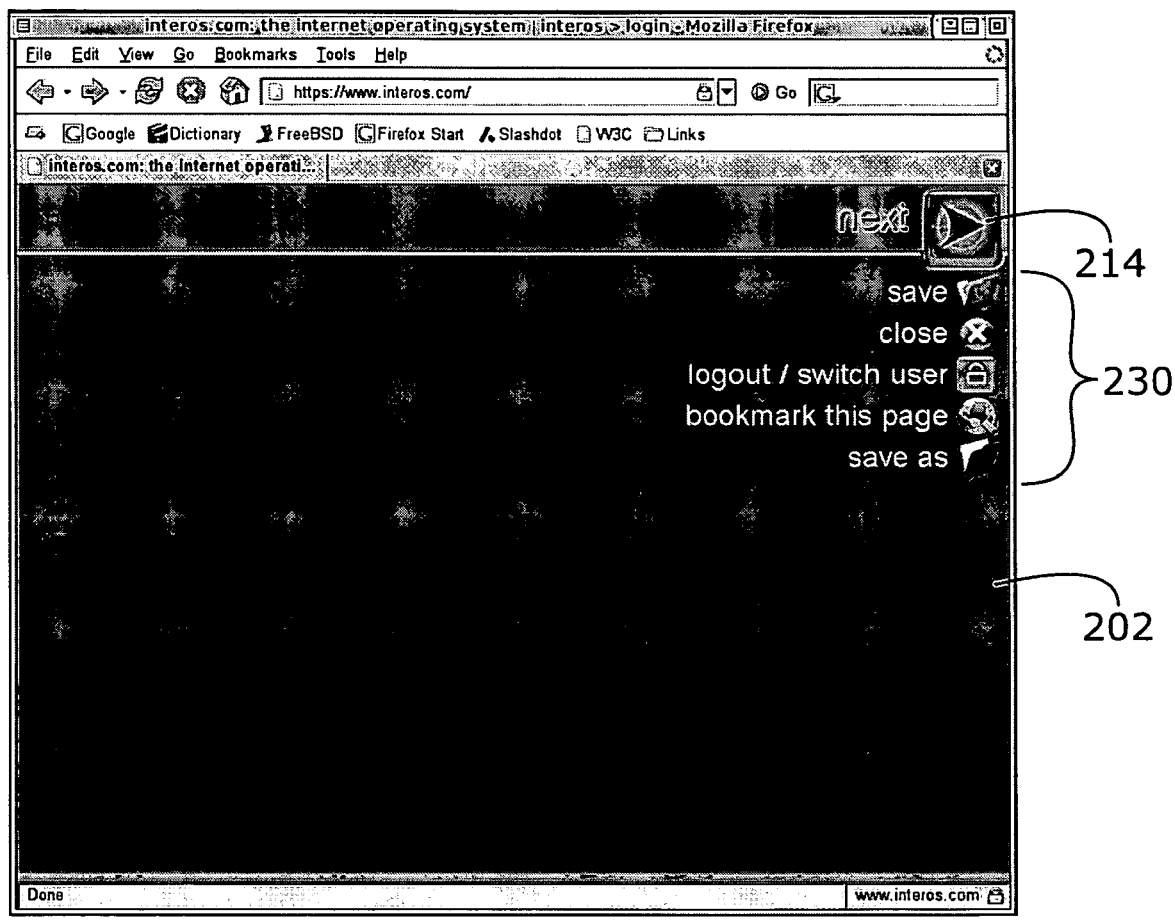
FIG. 6 is a screen shot of a next menu of the Interos embodiment of the invention.

Referring again to FIG. 3 and now also to FIG. 6, pressing next button 214 causes next menu 230 to be displayed. From next menu 214 the user is provided with a list of possible "next" options that typically include saving, switching to another running task, performing a "save as" or exiting without saving. If saving is selected, the file or data being worked upon is updated if it already exists. Otherwise, a new file is created and the user is presented a dialog requesting a filename and a location for the file. A logical default file location is typically provided.

If switching to another task is selected, the current task being performed by the user remains open but is relegated to the background. The next logical workspace is one selected from a list of running tasks.

If the exiting without saving option is chosen, no changes are saved, and the current task is closed and removed from the list of running tasks.

This menu may also be exited by clicking the "X" 226 in the upper right hand corner of the menu workspace 202.

Figure 7:
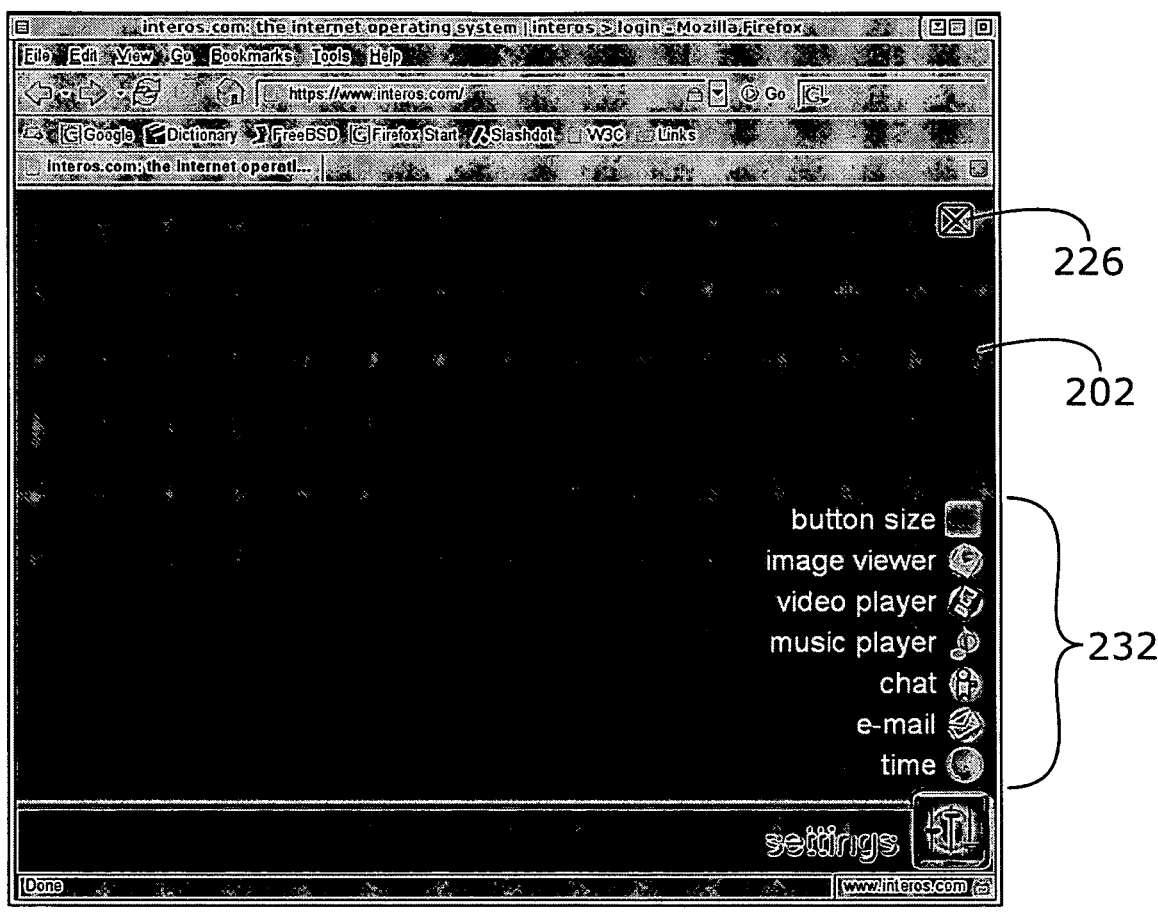
FIG. 7 is a screen shot of a settings menu of the Interos embodiment of the invention.

Referring again to FIG. 3 and now also to FIG. 7, clicking settings button 216 causes settings menu 232 to be displayed. From settings menu 232, the user may view and adjust settings. These include the calendar and clock, appearance preferences, as well as other defaults. Settings menu 232 may be exited by clicking "X" 226 in the upper right-hand corner of the workspace 202.

Interos.com is run on a properly configured and secured FreeBSD server or cluster and may be ported to run on OpenBSD to meet future security needs. Interos.com may be ported to run on Linux or any other suitable platform. BSD has been chosen for the exemplary embodiment because of its robustness and flexibility. BSD performs well in the areas of load balancing, data redundancy, scalability, standards compliance, stability, uptime, security and overall quality of service. BSD also has a distinct licensing advantage. Interos uses Apache Web Server with mod_ssl, serving up https from XHTML, JavaScript, Cascading Style Sheets and dynamic XHTML-generating FastCGI written in C. Interos provides secure access to a user's repository of documents and programs implemented in Java. Under mod_ssl, TLS is used to prevent eavesdropping by a third party. A high-grade RSA encryption makes cracking attempts extremely cost-prohibitive. Interos.com could be implemented with any number of other technologies, but currently accepted, proven Internet technologies have been chosen to optimize stability, speed, security, and scalability.

Interos consists primarily of a secured web server or cluster running server-side software to dynamically generate a standard generic web interface. The web interface is customized for each user using previously saved environmental preference variables. The preferences may be modified either by the user and, under certain circumstances, by a software application.

The user's account information is accessible via a web browser optimally capable of executing programs and media files. It is secured by encryption and a log-in code.

Interos.com may be served from a cluster of parallel multiprocessor computers or other computing devices, networked to each other and the Internet through a load-balancing router. Multiprocessor nodes may be used for their inherent performance benefits. Such server arrangements are known to those of skill in the art and it will be recognized that many other optional arrangements are possible.

Storage may be provided by a Network File System (NFS), typically consisting of RAID hard disk arrays that provide both speed and redundancy. RAID Level 5 has been chosen for versatility and efficiency as it provides a balance of high data transfer rates and redundant backup. It will be recognized, however, that other RAID levels and/or other disk storage topologies may also be used.

It is desirable that the server cluster be designed such that it is hot-scalable to maintain high quality service characterized by optimized speed, uptime and on-demand accessibility.

FreeBSD facilitates optimal software management of the cluster and subsystems.

It will be recognized that while an Internet-based embodiment of the inventive concepts is highly desirable, that the concepts may also be implemented in an enterprise network environment. A business or other organization or institution can benefit from the same uniform ease of use and universal accessibility that Internet interos.com users experience by deploying an Interos:enterprise embodiment on an internal network. While Interos.com is well-secured, Interos:enterprise can benefit from the additional level of security currently possible in a private, controlled network. The inventive concepts described hereinabove allow fast and secure access to databases and other internal information, documents and software, allow for fast and simple collaboration and file sharing, and offer secure group-level access control. Interos: enterprise provides an environment that is development friendly. That is, because standard Java applications are run within the Interos environment, new applications may readily be added to the list of available software applications provided to the network users.

Interos provides a hybrid online content-providing system and operating environment. With respect to content, the invention acts as a media and software distribution system and serves as an online repository for a user's files and software. The inventive concepts overcome many problems of the current computing model by providing an operating system that runs on any client device having a networked microprocessor and a screen, as well as capability to run a web browser (including an appropriate runtime environment such as Java or the like). In addition to Java, Flash, Shockwave and other plug-ins and browser media are supported. The Interos technology is scalable across any network—from the Internet to a business's private intranet.

An interositor is a portable electronic device running Interos.com or Interos:enterprise. Technically, any client device with a suitable web browser and a runtime environment (e.g., Java), and operating connected to interos.com or Interos: enterprise, is an interositor. A minimal configuration of hardware can yield a powerful but inexpensive portable device capable of all computer functionality by utilizing the inventive Interos system to provide a user computing environment including software applications, media, personal storage and communications/data exchange. While Interos technologies interact well with client devices of current generation computers and portable devices, ideally, the interositor provides a step forward in cost/performance of portable digital devices. The interositor consists of a handheld touch screen, ideally having approximately a 16:9 aspect ratio. The touch screen eliminates the need for most conventional buttons, since all virtual button functionality is provided by Interos.com or Interos:enterprise. Additional hardware for the full range of functionality may be embedded behind the touch screen.

A minimal embedded operating system ties drivers to hardware and provides the platform for the embedded web browser and embedded runtime environment. Numerous free or open source solutions for embeddable operating systems, Mozilla Gecko-based web browsers and runtime environments and/or virtual machines (including Java) already exist and can be deployed in a multitude of combinations. Wireless/cellular technology is used for the connection to Interos.com or an Interos:enterprise server. An audio transducer, typically a combination speaker/microphone may be provided for voice calls and A/V playback. Voice calls can be accomplished via standard cellular technology or with a Java Voice Over Internet Protocol (VOIP) application. Additional features may include a 3D screen, UHF and/or infrared communication capability, port replication of wired inputs, including USB and FireWire. The interositor may be packaged in a variety of ways, including a folding package.

The Interos system described hereinabove may be expanded to include a download feature to allow downloading of application code for use at a client machine in stand-alone mode. Such downloaded software could then perform on locally-stored data rather than on data stored on a server, when, for example, a network connection is unavailable. Because the application code is typically written in Java, such off-line operation is possible as long as a Java virtual machine is available on the client. This enhancement provides added flexibility to the Interos system.

Also, the application code on the server may be open source code thereby allowing free access to end users for purposes of modification. By providing a way for qualified software developers to add new applications to the Interos server, developers are encouraged to provide new applications or to enhance existing applications. Interos thereby becomes far more dynamic than any system created, owned, and managed exclusively by a single institution.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An Internet operating system, comprising:
  a server on which is stored an operating system made usable by various devices through portable coding methods comprising at least one application program comprising executable code that executes on said server and at least one embeddable applet-style application program for execution on a client device, at least one data file associated with a user, and preferences information associated with a user;

a client device adapted to execute a client-side web browser application program, said client-side web browser application program comprising means for parsing a stream of markup language, means for executing said at least one embeddable applet-style application program linked to by said stream of markup language; and a user interface, said interface comprising at least one action activation area adapted for initiating at least one category of processes; said client device being communicatively connected to said server;

means, disposed at said server, for embedding a link to said executable embeddable applet-style application program in a stream of markup language upon a command generated by a user of said client device;

whereby said embeddable applet-style application program is executed within said client-side web browser application program of said client device and all user interaction with said application program is via said user interface;

wherein said user preference information comprises user security information and, further comprising:

means disposed at said server for controlling access to said at least one data file and to said at least one application program based upon said user security information; and wherein each of said at least one action activation areas comprises a button.

2. The Internet operating system as recited in claim 1, wherein said server further comprises:

a web server layer.

3. The Internet operating system as recited in claim 2, wherein said web server layer comprises Apache web server software.

4. The Internet operating system as recited in claim 1, wherein said server further comprises means for implementing at least one of: CGI, and FastCGI.

5. The Internet operating system as recited in claim 1, wherein said means for controlling access comprises a sign-in screen generated at said server, and a user-supplied access code.

6. The Internet operating system as recited in claim 5, wherein said user-supplied access code comprises at least a user log-in ID and a password.

7. The Internet operating system as recited in claim 1, further comprising:

means, disposed at said server, for providing a graphical user interface (GUI) having an appearance determined at least in part by said user preferences information.

8. The Internet operating system as recited in claim 7, wherein said at least one action activation area is disposed in adjacent peripheral corners of said GUI.

9. The Internet operating system as recited in claim 8, wherein said processes comprise "new", "open", "next", and "settings".

10. The Internet operating system as recited in claim 9, wherein said processes comprising "new", "open", "next" and "settings" allow a user to do something new, open something saved, indicate to the system that he or she is prepared, and modify settings, respectively.

11. The Internet operating system as recited in claim 1, wherein each of said at least one action activation areas comprises a different color background button.

12. The Internet operating system as recited in claim 1, wherein said stream of markup language comprises at least one of: HTML, XML, and XHTML.

13. The Internet operating system as recited in claim 1, wherein said at least one application program comprises an application selected from the group: office/productivity, database, communication, multimedia, imaging, and games.

14. The Internet operating system as recited in claim 1, wherein said executable code comprises at least one of Java source code, and Java byte code.

15. The Internet operating system as recited in claim 1, wherein at least one of said at least one application programs comprises open source code.

\* \* \* \* \*